United States Patent [19]

Thiersault et al.

[11] E Patent Number: Re. 33,269

[45] Reissued Date of Patent: Jul. 17, 1990

[54] PROCESS FOR THE TREATMENT OF LINEAR LOW DENSITY POLYETHYLENE BY ORGANIC PEROXIDES WHICH GENERATE FREE RADICALS

[75] Inventors: Jean-Paul Thiersault, Saint Mitre les Remparts; Alain Senez, Callas-Cabries; Jean L. Vidal, Martigues, all of France

[73] Assignee: The British Petroleum Company p.l.c., London, United Kingdom

[21] Appl. No.: 267,548

[22] Filed: Nov. 4, 1988

Related U.S. Patent Documents

Reissue of:

[64] Patent No.: 4,460,750
Issued: Jul. 17, 1984
Appl. No.: 392,021
Filed: Jun. 25, 1982

[30] Foreign Application Priority Data

Jun. 22, 1981 [FR] France ..... 81 12184

[51] Int. Cl.[5] ..... C08F 8/00
[52] U.S. Cl. ..... 525/333.8; 525/387
[58] Field of Search ..... 525/333.8, 387

[56] References Cited

U.S. PATENT DOCUMENTS

| | | | |
|---|---|---|---|
| 2,993,882 | 7/1961 | Ashby | 525/387 |
| 3,956,253 | 5/1976 | Braun | 525/333.8 |
| 4,006,283 | 2/1977 | MacKenzie, Jr. et al. | 525/333.8 |
| 4,015,058 | 3/1977 | Schober | 525/333.8 |
| 4,025,706 | 5/1977 | Schober | 525/333.8 |

FOREIGN PATENT DOCUMENTS 1379853 1/1975 United Kingdom .

*Primary Examiner*—Joseph L. Schofer
*Assistant Examiner*—Bernard Lipman
*Attorney, Agent, or Firm*—Brooks Haidt Haffner & Delahunty

[57] ABSTRACT

The invention relates to a process of thermomechanical treatment in the molten state, in the presence of organic peroxides, of co-polymers with a density less than 0.935, obtained by co-polymerization under a pressure of less than 4 $MP_a$ of ethylene and a higher alpha-olefin. The co-polymers thus treated may advantageously be used for the manufacture of finished objects such as films according to the current techniques of conversion of "high pressure" type polyethylene.

7 Claims, No Drawings

PROCESS FOR THE TREATMENT OF LINEAR LOW DENSITY POLYETHYLENE BY ORGANIC PEROXIDES WHICH GENERATE FREE RADICALS

Matter enclosed in heavy brackets [ ] appears in the original patent but forms no part of this reissue specification; matter printed in italics indicates the additions made by reissue.

The invention relates to a process for the treatment of co-polymers of the linear low-density polyethylene type ("LLDPE"), which process has the object of imparting to these co-polymers better suitability for conversion into finished objects such as films, by means of machines and under conditions currently employed for the conversion of low-density polyethylene obtained by polymerization of the ethylene under high pressure which gives rise to free radicals, known as "high pressure polyethylene" ("HPPE").

It is well known that one can manufacture these LLDPE's by co-polymerizing mixtures of ethylene and a higher alpha-olefin containing approximately 4 to 20 percent by weight of this higher alpha-olefin by way of co-monomer, under a pressure of less than 4 $MP_a$. The co-polymers thus obtained possess a density of less than 0.935 and a molecular structure characterized by comparatively short branchings which are distributed statistically along the molecular chain and whose nature depends on the co-monomer utilized. These LLDPE's have a branching index generally greater than 0.95, the branching index of a polyethylene or a co-polymer of ethylene and another alpha-olefin being measured by the ratio between its intrinsic viscosity determined in solution in trichlorobenzene and the calculated intrinsic viscosity of a polyethylene of perfectly linear structure and of identical molecular distribution, measured by gel permeation chromatography.

As compared with HPPE's which also have a density of less than 0.935, obtained by free radical producing polymerization of the ethylene under high pressure, which are polymers whose molecular structure shows long branchings and whose branching index is generally of the order of 0.6 to 0.7, the linear low-density polyethylenes possess numerous advantages, to wit:

greater rigidity at equal density,
superior hot mechanical strentgh,
improved resistance to cracking under tension,
less jamming, that is to say when tubular film is being produced it is better suited for the opening of the tube after it has been flattened,
better stretchability and improved resistance to perforation in film form.

However, the LLDPE's generally have an inferior transparency to that of the HPPE's. In addition, their techniques of utilization which are closer to those of polyethylenes with a high density, greater than 0.935, also obtained according to processes of low-pressure polymerization, than to those relating to HPPE's, may sometimes appear to be a drawback in applications such as the production of films with a thickness of 40 to 200 microns, known as "thick films", a field in which the HPPE is well established on the market and the technology of which is difficult to modify.

The applicants have now found, and it is an object of this invention to provide, a process for treating copolymers of the LLDPE type which improves their transparency and renders them suitable for conversion into finished objects, such as film, under operating conditions used currently for the conversion of high pressure polyethylene, without appreciably altering their excellent mechanical properties.

The invention therefore relates to a process for treating LLDPE with a fluidity index at 190° C. of under 2.16 kg according to NFT 51016—Method A, comprised between 0.3 and 50, and a branching index greater than 0.95, which process consists in the fact that the LLDPE is treated thermomechanically in the molten state at a temperature of less than 220° C., in the presence of an organic peroxide which produces free radicals, used in an amount between 0.005 and 1 percent by weight, preferably between 0.02 and 0.2 percent (sic) by weight, so that the LLDPE treated has a branching index comprised between 0.8 and 0.95 and its gel rate, measured by extraction with boiling xylene according to the standardized test referred to above, is nil.

The gelling rate or insolubles rate in boiling xylene is measured by means of an extractor of the Kumagawa type; a polymer sample of approximately 1 g is used and 0.4 liters of xylene as solvent. The extraction conditions are as follows:

Atmospheric pressure: $10^5 \pm 1{,}500$ Pa
Temperature: 130° C.
Duration of extraction: 6 hours.

The residue of the sample, if any exists, is rinsed in acetone, then dried under nitrogen and stored.

The gelling rate is the ratio, in percent, between the end weight of the sample after extraction and its initial weight.

The LLDPE treated according to the invention may be obtained by the co-polymerization of a mixture consisting of 80 to 96 percent by weight, of ethylene and 4 to 20 percent by weight of a higher $C_3$–$C_8$ alpha-olefin, selected preferably from among propylene, n-butene-1, n-hexene-1, methyl-4-pentene-1, n-octene-1, the co-polymerization being carried out according to one of the known low pressure processes, in particular under a pressure less than 4 $MP_a$, in the presence of a catalyst containing a compound of a transition metal of subgroups IVa, Va and VIa of the Periodic Table of Elements, this catalyst generally being activated by an organometallic compound such as an organo-aluminum compound. In particular, the LLDPE may be obtained by gaseous phase co-polymerization. Results, which are particularly interesting, are obtained when the LLDPE is prepared according to the process for co-polymerizing ethylene and a higher alpha-olefin in a fluid bed, as described in French Pat. No. 2 405 961.

According to the invention, it is preferred to make use of organic peroxides which produce free radicals, the decomposition of which is negligible below 120° C. and the half-life of which is high, generally greater than 1 minute at 160° C., such as for example the following organic peroxides: Di-terbutyl peroxide, dicumyl peroxide, 2,5-dimethyl-2,5-di(terbutylperoxy)-hexane, 2,5-dimethyl-2,5-di-(terbutylperoxy)-hexyne, butyl-4,4-bis-(terbutylperoxyvalerate), cumyl hydroperoxide, 1,1-bis-(terbutylperoxy)-3,3,5-trimethylcyclohexane, 1,3-di-(terbutylperoxy)di-isopropylbenzene.

The quantity of organic peroxide utilized, comprised between 0.005% and 1% by weight and generally comprised between 0.02% and 0.2% by weight of copolymer, depends somewhat on the nature of the peroxide employed. It is advisable to use a quantity of organic peroxide which is both sufficient to obtain a modification in the co-polymer structure, bringing its branching index to a figure of less than 0.95, and not so high as to bring about a cross-linking of the co-polymer which is harmful to the quality of the finished object, especially when film production is involved, the absence of cross-linking of the co-polymer being characterized by a zero value of the gelling rate.

According to the invention, the organic peroxide, which produces free radicals, must be suitably mixed with the LLDPE before reaction, at a temperature less than the decomposition temperature of the peroxide, the mixture obtained then being subjected to the thermomechanical treatment in the molten state, at a temperature higher than the decomposition temperature of the peroxide.

It is possible to carry out the mixing of the LLDPE powder and an organic peroxide which is in liquid or solid form by means of a powder mixer of the current type. It is essential that the homogenization should be performed as perfectly as possible. In fact inadequate homogenization of the mixture would lead, after the thermomechanical treatment at a temperature higher than the decomposition temperature of the peroxide, to partially cross-linked products having a gelling rate which is not zero.

It is therefore preferable to perform the homogenization of the organic peroxide mixture and the LLDPE by grinding in the molten state, for example by means of an extruder of the current type, at a temperature below the decomposition temperature of the peroxide.

A simple method for performing this homogenization consists in introducing the mixture of LLDPE and peroxide directly into the extruder used to convert the LLDPE into finished objects, the feed zone of this machine being maintained at a temperature lower than the decomposition temperature of the organic peroxide. In this way, the homogenization of the mixture of LLDPE and peroxide may thus be suitably performed prior to passage into the treatment zone proper where the temperature is higher than the decomposition temperature of the peroxide.

However, the best results are obtained when the co-polymer previously mixed with the suitable quantity of organic peroxide is subjected to a thermomechanical treatment in the molten state in 2 stages, both carried out at a temperature comprised between the limits of 130° C. and 220° C., under conditions such that the viscosity of the co-polymer is sufficiently low and its decomposition sufficiently restricted, the first stage or homogenization stage of the mixture being performed under conditions of temperature and duration according to which less than 5% of the organic peroxide is decomposed, the second stage or reaction stage being performed under conditions of temperature and duration according to which more than 90 percent by weight of the organic peroxide is decomposed.

In practice, thermomechanical treatment may be performed by means of extruders of the current type, the treatment period having a given duration, comprised usually between 0.5 and 1.5 minutes; moreover, depending on the known half-life of the peroxide utilized at the particular temperature, that is to say the period at the end of which 50% of the peroxide is decomposed.

Under these conditions the thermomechanical treatment of the co-polymer in 2 stages, with the peroxide added, is performed as regards the first stage at a temperature at which the half-life of the peroxide is greater than 13 times the duration of this first treatment stage, and as regards the second stage, at a temperature at which the half-life of the peroxide in less than 0.4 times the duration of this second treatment stage.

The co-polymers of the LLDPE type, treated according to the invention, whose branching index is comprised between 0.8 and 0.95 and whose gelling rate is zero, are particularly suited for the production of films having good transparency and excellent mechanical properties, according to the current extrusion techniques, by means of machines and under conditions of operation used for the production of films from low-density polyethylene obtained under high pressure.

EXAMPLE

The LLDPE used is a co-polymer of ethylene and propylene of NATENE BD 302. It possesses the following specifications:

Content of configurations derived from propylene: 12%
Density as per NFT 51063 standard:L 0.920
Fluidity index under 2.16 kg at 190° C. as per NFT 51016 standard, Method A: 2
Branching index: 1
Content of stabilization additive:
Calcium stearate: 0.15% by weight
Butylhydroxytoluene: 0.10% by weight
The organic peroxide used, of VAROX make, is 2,5-dimethyl-2,5-di-(terbutylperoxy)-hexane deposited on an inert mineral support at the rate of 50 parts by weight of peroxide per 50 parts by weight of support.
The half-life periods of this organic peroxide are:
15 minutes at 150° C.,
5 minutes at 160° C.,
and 6 seconds at 200° C.

The treatment is carried out in 2 stages by means of a double-screw extruder with diameter of 28 mm, of Warner-Pfleiderer make.

First stage

The homogenization of the mixture of peroxide and LLDPE in the molten state is carried out during a first run through the extruder for a period of 1 minute at 150° C.

Second stage

This stage consists of a second run through the same extruder, the treatment being carried out at 200° C. for a period of 1 minute, during which the peroxide undergoes practically complete decomposition.

Table I gives the chief characteristics of the "NATENE BD 302" LLDPE treated under these conditions with increasing doses of peroxide, varying from 0.02% to 0.2%. By way of comparison, Table I also gives the corresponding characteristics of untreated "NATENE BD 302", of two other untreated LLDPE's, with a fluidity index of 1.1 and 0.5 and of three "high-pressure" polyethylenes A, B and C with a fluidity index of 2, 0.75 and 0.3.

First of all it is found that the treatment with peroxide does not modify the density of the "NATENE BD 302" co-polymer but does have an effect on the branching index which decreases with the levels of peroxide used, approaching the values of the branching indices of "high-pressure" polyethylenes.

It is found that "NATENE BD 302" LLDPE treated with peroxide possesses very good fluidity under high shearing stress. In particular it possesses an apparent viscosity at 190° C. under shearing stress of $9.08 \times 10^4$ Pa, less than that of an untreated LLDPE with comparable density and fluidity index.

Furthermore, when the quantity of peroxide used is greater than 0.1 percent by weight of the LLDPE, the apparent viscosity at 190° C. under shearing stress of $9.08 \times 10^4$ Pa is less than that of a high-pressure polyethylene with the same fluidity index.

It is also found that the activation energy of the viscosity of the "NATENE BD 302" LLDPE treated with peroxide decreases from −29.7 to −35.1 $10^3$ J/mole when the peroxide levels used increase, and that its value approaches those of activation energies of "high-pressure" polyethylenes.

All these modifications of the rheological parameters of the LLDPE resulting from treatment with peroxide according to the invention greatly facilitate the use of these co-polymers according to techniques used to convert high-pressure polyethylene into film. In particular, the extrusion throughputs are increased provided the extrusion conditions are identical, the autogenous heating of the material being considerably reduced.

It is also found that the excellent mechanical properties of the LLDPE, such as tensile strength, elongation at break, resistance to stress cracking and also its resistance to heat, are not altered by the treatment with peroxides according to the invention.

Finally, it is found that the treatment with peroxide distinctly improves the transparency of the LLDPE.

TABLE I

| | Peroxide level (% by wt.) | Density | Branching index | Fluidity index (1) | Apparent viscostiy (poises) (2) | Activation energy of the viscosity ($10^3$ J/mole) | Tensile strength on break (MPa) | Elongation at break (%) | Resistance to stress cracking (hours) (3) | Gelling rate |
|---|---|---|---|---|---|---|---|---|---|---|
| "High pressure" polyethylene A | — | 0.920 | 0.7 | 2 | $0.82 \times 10^4$ | −43.5 | | | 2 | 0 |
| "High pressure" polyethylene B | — | 0.920 | 0.7 | 0.75 | $2.4 \times 10^4$ | | | | | 0 |
| "High pressure" polyethylene C | — | 0.918 | 0.7 | 0.3 | $6.9 \times 10^4$ | −48.9 | 12.5 | 900 | | 0 |
| "NATENE BD 302" LLDPE | — | 0.920 | 1 | 2 | $1.4 \times 10^4$ | −29.7 | 13.7 | 1700 | 70 | 0 |
| "NATENE BD 405" LLDPE | — | 0.916 | 0.96 | 1.1 | $4.4 \times 10^4$ | | | | >1000 | 0 |
| "NATENE BD 404" LLDPE | — | 0.913 | 0.96 | 0.5 | $13 \times 10^4$ | | | | >1000 | 0 |
| "NATENE BD 302" LLDPE treated with peroxide | 0.02 | 0.920 | 0.94 | 1.6 | $1.75 \times 10^4$ | −32.2 | 13.7 | 1700 | 250 | 0 |
| | 0.05 | 0.920 | 0.88 | 1.05 | $2.15 \times 10^4$ | −32.6 | 13.8 | 1600 | 900 | 0 |
| | 0.1 | 0.920 | 0.84 | 0.75 | $2.45 \times 10^4$ | −33.0 | 13.8 | 1500 | <1000 | 0 |
| | 0.2 | 0.920 | 0.82 | 0.30 | $3.7 \times 10^4$ | −35.1 | 13.8 | 1400 | >1000 | 0 |

(1) Fluidity index under 2.16 kg at 190° C. as per standard NFT 51016 Method A
(2) Apparent viscosity at 190° C. under shearing stress of $9.08 \times 10^4$ Pa
(3) Resistance to stress cracking as per standard ASTM D 1693

We claim:

1. A process for treating co-polymers of linear low density polyethylene having a density of less than 0.935, a fluidity index at 190° C. under 2.16 kg as per NFT 51016 standard, Method A, of between 0.3 and 50, and a branching index greater than 0.95, in which the co-polymer is obtained by *a gaseous phase* copolymerization under a pressure less than 4 $MP_a$, of a mixture of ethylene and *4 to 20 percent by weight of* a higher $C_{3-8}$ alpha-olefin [containing 4 to 20 percent by weight of the higher alpha-olefin], *in the presence of a catalyst containing a compound of a transition metal of sub-groups IVa, Va and VIa of the Periodic Table of Elements, the said catalyst being activated by an organometallic compound, this process* comprising treating the co-polymer thermomechanically in the molten state at a temperature less than 220° C., in the presence of an organic peroxide which produces free radicals, in which the organic peroxide is employed in an amount within the range of 0.005% to 1% by weight of the co-polymer, such that the treated co-polymer has a branching index within the range of 0.8 to 0.95 and its gelling rate, as measured by extraction with boiling xylene, is zero.

2. A process as claimed in claim 1 in which the organic peroxide is employed in an amount within the range of 0.02% to 0.2% by weight of the co-polymer.

[3. A process as claimed in claim 1 in which the co-polymer is obtained from a mixture of ethylene and a $C_3$–$C_8$ alpha-olefin by copolymerization in the presence of a catalyst containing a compound of a transition metal of sub-groups IVa, Va, VIa of the Periodic Table of Elements.]

4. A process as claimed in claim [3] *1* in which the alpha-olefin is selected from the group consisting of propylene, n-butene-1, methyl-4-pentene-1, n-hexene-1, and n-octene-1.

5. A process as claimed in claim 1 in which the organic peroxide is selected from the group consisting of di-terbutyl peroxide, dicumyl peroxide, [2,5-dimethyl-]2,5-dimethyl-2,5-di(terbutylperoxy)-hexane, 2,5-dimethyl-2,5-di(terbutylperoxy)-hexyne, butyl-4,4-bis(-terbutylperoxyvalerate), dicumyl hydroperoxide, 1,1-bis(terbutylperoxy)-3,3,5-trimethylcyclohexane, 1,3-di(-terbutylperoxy)di-isopropylbenzene.

6. A process as claimed in claim 1 in which the co-polymer is subjected to the thermomechanical treatment in two stages at temperatures within the range of 130° C. to 220° C., the first stage of the treatment being carried out at a temperature at which the organic peroxide used has a half-life period greater than 13 times the duration of this first treatment stage, the second stage of treatment being carried out at a temperature at which the organic peroxide used has a half-life period of less than 0.4 times the duration of this second treatment period.

7. Co-polymers prepared by the process of claim 1.

8. Film formed of the co-polymers produced by the method of claim 1.

* * * * *

UNITED STATES PATENT AND TRADEMARK OFFICE

CERTIFICATE OF CORRECTION

PATENT NO. : Re. 33,269

DATED : July 17, 1990

INVENTOR(S) : JEAN-PAUL THIERSAULT

It is certified that error appears in the above-identified patent and that said Letters Patent is hereby corrected as shown below:

Column 4, line 10, "standard:L 0.920" should read --standard: 0.920--

Signed and Sealed this

Tenth Day of December, 1991

*Attest:*

HARRY F. MANBECK, JR.

*Attesting Officer*

*Commissioner of Patents and Trademarks*

UNITED STATES PATENT AND TRADEMARK OFFICE

CERTIFICATE OF CORRECTION

PATENT NO. : Re. 33,269

DATED : July 17, 1990

INVENTOR(S) : Jean-Paul Thiersault et al

It is certified that error appears in the above-identified patent and that said Letters Patent is hereby corrected as shown below:

Title Page:

"[73] Assignee: The British Petroleum Company p.l.c., London, United Kingdom"

should read:

--[73] Assignee: BP Chemicals Limited, London, United Kingdom--.

Signed and Sealed this

Seventh Day of April, 1992

*Attest:*

*Attesting Officer*

HARRY F. MANBECK, JR.

*Commissioner of Patents and Trademarks*